United States Patent [19]
Ross

[11] Patent Number: 6,042,135
[45] Date of Patent: Mar. 28, 2000

[54] HITCH ASSEMBLY AND TRAILER

[76] Inventor: Louis J. Ross, 1060 Lighthouse Dr., Cheboygan, Mich. 49721

[21] Appl. No.: 08/900,740

[22] Filed: Jul. 26, 1997

[51] Int. Cl.[7] ..................................................... B60D 1/30
[52] U.S. Cl. ........................................ 280/456.1; 280/484
[58] Field of Search ................................... 280/457, 494, 280/500, 501, 459, 460.1, 483, 484, 486, 488, 456.1

[56] References Cited

U.S. PATENT DOCUMENTS

| | | |
|---|---|---|
| D. 235,760 | 7/1975 | Genzel . |
| 854,196 | 5/1907 | Brown ...................... 280/474 |
| 1,234,788 | 7/1917 | Milner . |
| 1,401,786 | 12/1921 | Kapferer . |
| 2,078,492 | 4/1937 | Gurton et al. ............... 280/474 |
| 2,187,136 | 1/1940 | Mellinger . |
| 2,198,270 | 4/1940 | Maranville . |
| 2,240,886 | 5/1941 | Greiner . |
| 2,287,234 | 6/1942 | Ducharme ................... 280/483 |
| 2,345,945 | 4/1944 | Miner . |
| 2,475,174 | 7/1949 | Boone . |
| 2,568,261 | 9/1951 | Stade ........................ 280/405.1 |
| 2,570,482 | 10/1951 | Pruitt ........................ 280/494 |
| 2,638,353 | 5/1953 | Danielson et al. ......... 280/474 |
| 2,712,945 | 7/1955 | Peterson . |
| 2,828,144 | 3/1958 | Hosmer . |
| 2,840,411 | 6/1958 | Mason ........................ 280/483 |
| 3,033,593 | 5/1962 | Zaha . |
| 3,098,257 | 7/1963 | Zaha ......................... 280/457 |
| 3,123,382 | 3/1964 | Toland ....................... 280/474 |
| 3,236,541 | 2/1966 | Poteet ........................ 280/494 |
| 3,271,050 | 9/1966 | Saunders .................... 280/483 |
| 3,291,503 | 12/1966 | DeLay ........................ 280/474 |
| 3,447,813 | 6/1969 | Wolf . |
| 3,708,183 | 1/1973 | Jones ......................... 280/483 |
| 3,779,580 | 12/1973 | Thelen . |
| 4,076,264 | 2/1978 | Chatterley . |
| 4,148,498 | 4/1979 | Taylor, Jr. .................. 280/486 |
| 4,239,253 | 12/1980 | Golze . |
| 4,295,659 | 10/1981 | Mergen . |
| 4,305,602 | 12/1981 | Ungvari et al. . |
| 4,388,012 | 6/1983 | Erickson . |
| 4,426,097 | 1/1984 | Livingston . |
| 4,452,465 | 6/1984 | Bourke . |
| 4,512,593 | 4/1985 | Ehrhardt . |
| 4,645,230 | 2/1987 | Hammons . |
| 4,664,403 | 5/1987 | Livingston . |
| 4,711,461 | 12/1987 | Fromberg ................... 280/494 |
| 4,890,854 | 1/1990 | Hoover . |
| 5,108,121 | 4/1992 | Collis ........................ 280/414.1 |
| 5,244,226 | 9/1993 | Bergh . |
| 5,375,867 | 12/1994 | Kass et al. ................. 280/457 |
| 5,413,364 | 5/1995 | Hafenforfer ................ 280/32.7 |
| 5,474,320 | 12/1995 | Bojarski et al. ............ 280/442 |
| 5,478,124 | 12/1995 | Warrington et al. ........ 280/481 |
| 5,507,515 | 4/1996 | Schellenberg et al. ..... 280/495.1 |
| 5,580,088 | 12/1996 | Griffith ...................... 280/479.2 |
| 5,647,604 | 7/1997 | Russell ...................... 280/492 |
| 5,664,796 | 9/1997 | Huyzers ..................... 280/400 |
| 5,709,274 | 1/1998 | Herbold ..................... 280/494 |
| 5,836,603 | 11/1998 | Logan et al. ............... 280/483 |
| 5,853,187 | 12/1998 | Maier ........................ 280/495 |

*Primary Examiner*—Kevin Hurley
*Assistant Examiner*—Andrew J. Fischer
*Attorney, Agent, or Firm*—Bliss McGlynn, P.C.

[57] ABSTRACT

A hitch assembly and a trailer for a motor vehicle includes a hitch receiver mounted to a motor vehicle and mounting member securable to the hitch receiver, an adaptor structure secured to the mounting member, a receiving tube having a top end and a bottom end, and a sliding ring fastened to the receiving tube movable along the receiving tube between the top end and the bottom end to provide a first degree of motion.

11 Claims, 9 Drawing Sheets

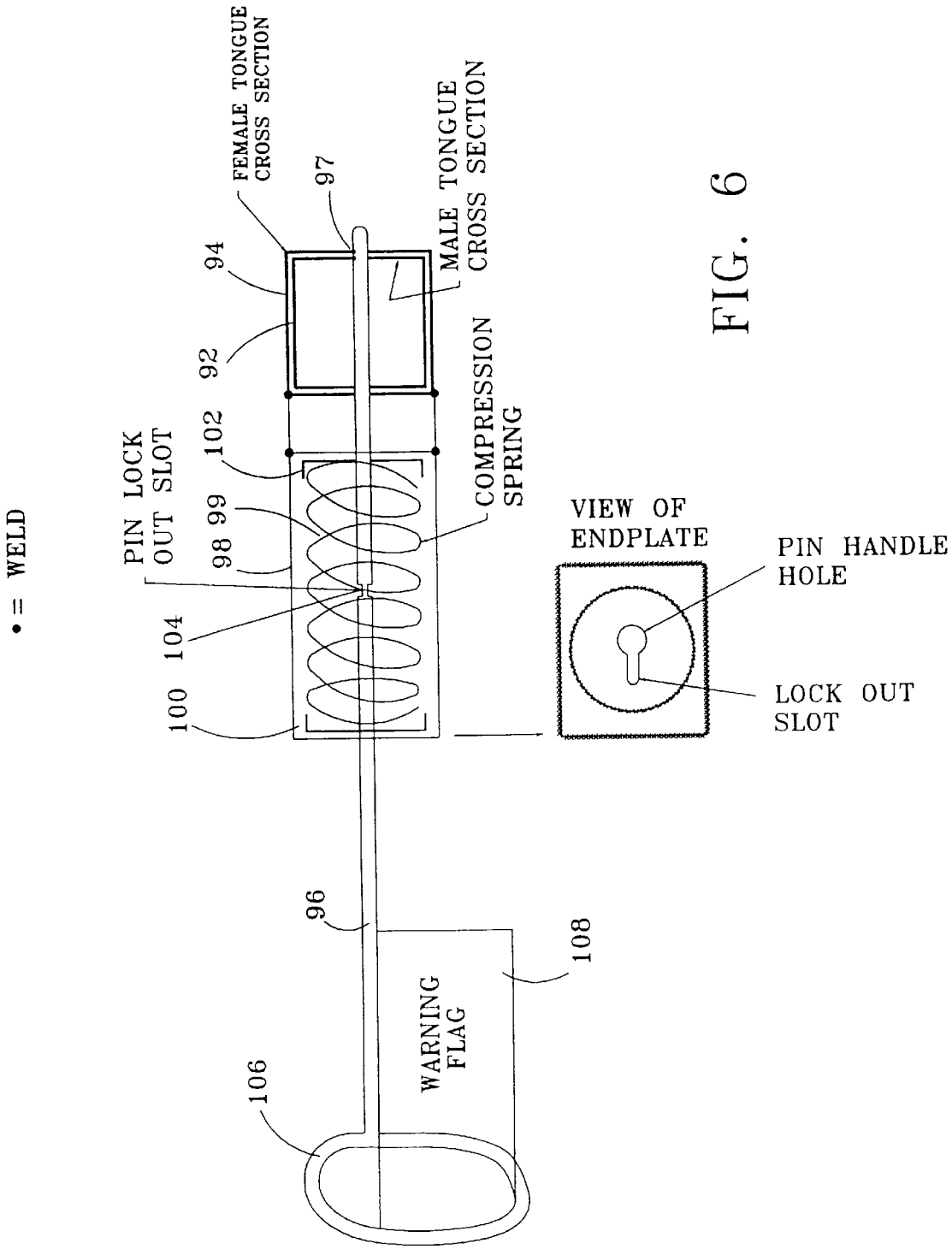

HITCH ASSEMBLY AND TRAILER

BACKGROUND OF THE INVENTION

1. Field of the Invention

The present invention relates generally to hitches and trailers and, more specifically, to a hitch assembly and trailer for a motor vehicle.

2. Description of the Related Art

Oftentimes, trailers are used in conjunction with motor vehicles. The trailers are attached to a rear of the motor vehicle. An example of such a trailer is disclosed in U.S. Pat. No. 1,234,788 to Milner. This patented trailer has a body having two spaced bars at its forward end which are secured to a rear end of a motor vehicle. The trailer also includes four wheels at the corners of a body that are journaled in forks which are, in turn, journaled in boxes or bearings which are secured to the body.

U.S. Pat. No. 3,033,593 to Zaha discloses a hitch assembly that incorporates the use of three hitch points and dirigible wheels. This hitch assembly is difficult to operate. More specifically, connecting the center hitch point to the motor vehicle while properly aligning the outer two hitch points to be connected to the motor vehicle is difficult. As a result, the trailer and the motor vehicle require proper alignment. Therefore, there is a need in the art for a hitch assembly and a trailer which provides for connecting the trailer to the motor vehicle without perfect alignment therebetween.

SUMMARY OF THE INVENTION

It is, therefore, one object of the present invention to provide a new and improved hitch assembly for connecting a trailer to a motor vehicle.

It is another object of the present invention to provide a hitch assembly having a single point connection between a trailer and a motor vehicle.

It is yet another object of the present invention to provide a trailer with steerable wheels that is capable of carrying loads.

It is still another object of the present invention to provide a trailer with wheels having anti-pivot brakes.

It is a further another object of the present invention to provide a trailer that allows easier wheel repair.

It is a still further object of the present invention to provide a trailer that can be extended and tilted.

Accordingly, the present invention is a hitch assembly to connect a trailer to a motor vehicle. The hitch assembly includes a hitch receiver mounted to a motor vehicle and a mounting member securable to the hitch receiver. The hitch assembly includes an adaptor secured to the mounting member. The adaptor includes a receiving tube having a top end and a bottom end. The hitch assembly includes a sliding ring fastened to the receiving tube movable along the receivable tube between the top end and the bottom end to provide a first degree of motion.

Further, the hitch assembly includes a swivel tongue attachable to the sliding ring. The swivel tongue includes a distal end and is rotatable about a longitudinal axis to provide a second degree of motion.

Additionally, the present invention is a trailer including a frame and at least two wheels operatively connected to the frame. The trailer also includes means for extending a length of the trailer and for tilting the frame.

One advantage of the present invention is that a new and improved hitch assembly is provided to connect a trailer to a motor vehicle. Another advantage of the present invention is that the hitch assembly is a spring mounted, single point, close coupling design which will connect with limited effort to a motor vehicle regardless of either the slope or contour of the surface which supports them. Yet another advantage of the present invention is that the hitch assembly is easier to use and more versatile. Still another advantage of the present invention is that a new and improved trailer is provided with steerable wheels having anti-pivot braking for when the wheels are airborne and is capable of carrying loads. A further advantage of the present invention is that the trailer has lockable legs capable of supporting a parked trailer in a level or angled position or to passively jack the trailer up to allow wheel repair. Yet a further advantage of the present invention is that the trailer is capable of being easily converted to a conventional extra long tongue trailer with non-steerable wheels. Still a further advantage of the present invention is that the trailer is capable of tilting.

Other objects, features and advantages of the present invention will be readily appreciated as the same becomes better understood after reading the subsequent description when considered in connection with the accompanying drawings.

BRIEF DESCRIPTION OF THE DRAWINGS

FIG. 6 is a fragmentary view of a portion of the trailer of FIG. 1.

DESCRIPTION OF THE PREFERRED EMBODIMENT(S)

Figure 1:
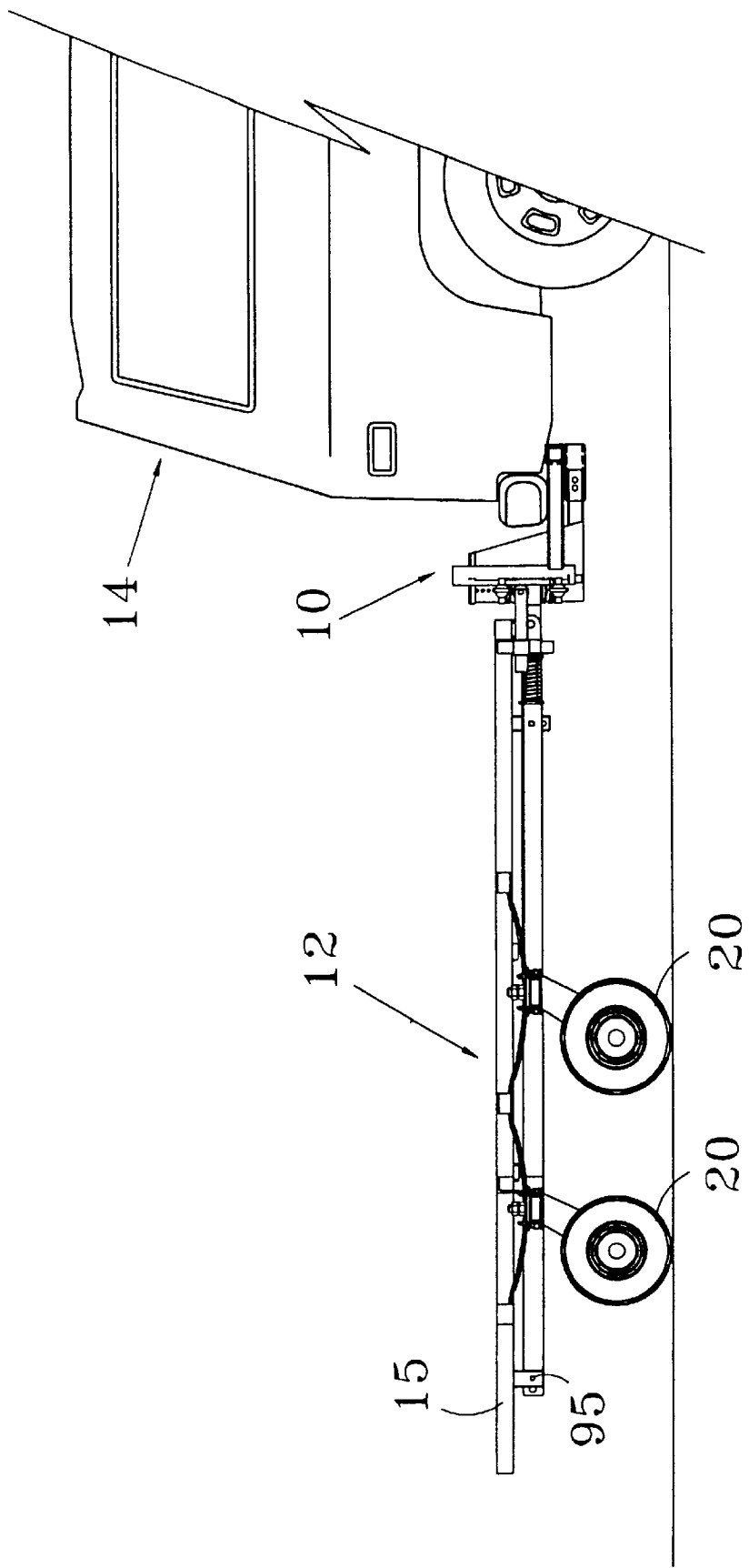
FIG. 1 is a elevational view of a hitch assembly and trailer, according to the present invention, illustrated in operational relationship with a motor vehicle.

Referring to FIG. 1, one embodiment of a hitch assembly 10, according to the present invention, is illustrated in operational relationship with a trailer, according to the present invention and generally shown at 12. The hitch assembly 10 allows the trailer 12 to be hitched or connected to a motor vehicle, generally indicated at 14. It should be appreciated that the trailer 12 may be of a flat bed, cargo box, camper type or the like. It should also be appreciated that the trailer 12 may be connected to a front of the motor vehicle 14 for pushing the trailer 12 or connected to a rear of the motor vehicle 14 for pulling the trailer 12.

Figure 2:
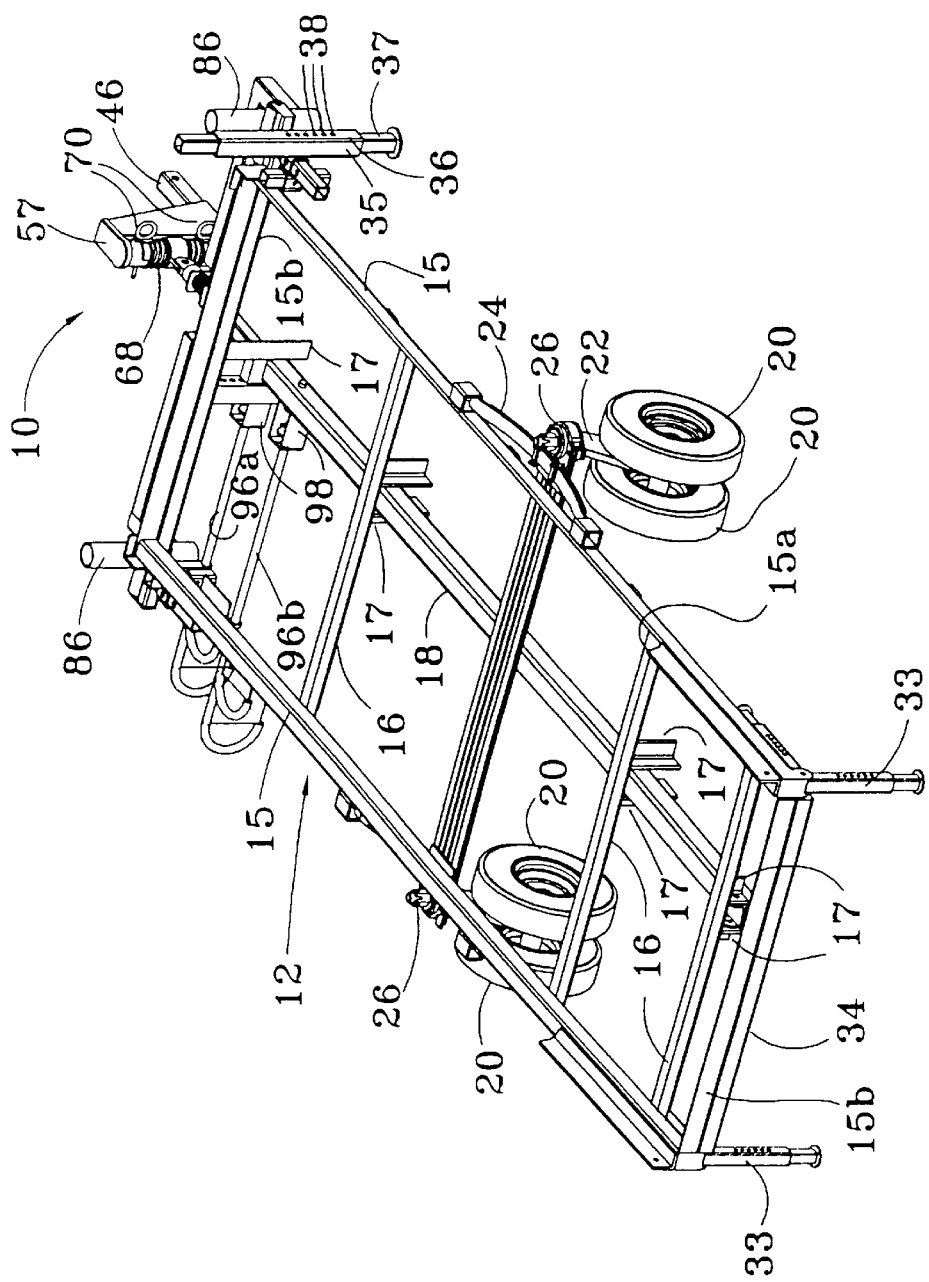
FIG. 2 is a perspective view of the hitch assembly and trailer of FIG. 1.
Figure 3:
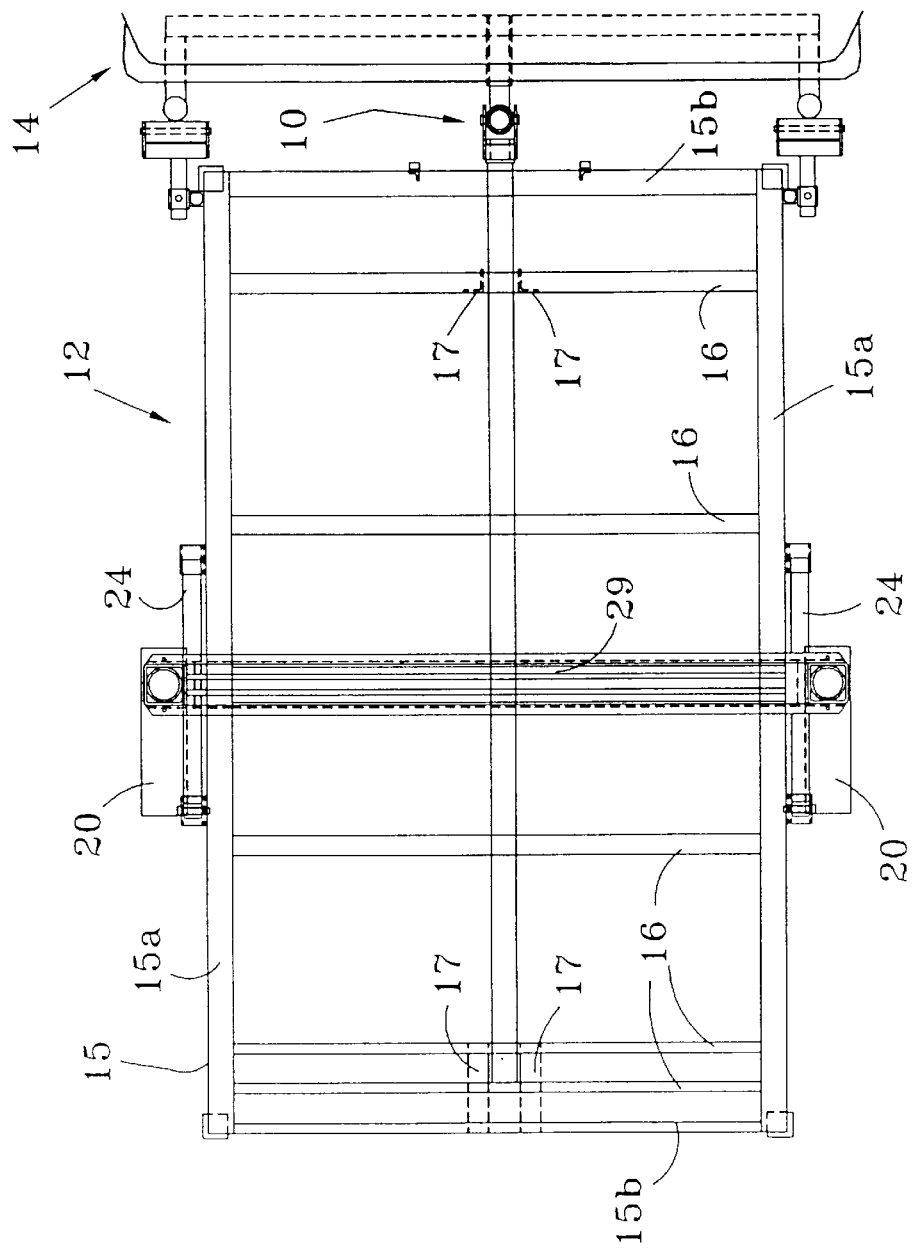
FIG. 3 is a plan view of the hitch assembly and trailer of FIG. 1.

Referring to FIGS. 1 through 3, the trailer 12 includes a generally rectangular frame 15 fabricated from a metal or other rigid material suitable for the purposes of the trailer 12. The frame 15 includes two longitudinal side members 15a and two transverse end members 15b. The frame 15 includes a plurality of cross members 16 extending between the side members 15a. In one embodiment, the cross members 16 extend generally perpendicularly to the side members 15a. The frame 15 includes a plurality of guides 17 which extend downwardly from each of the cross members 16. The frame 15 includes a length adjuster 18 to extend through the guides 17 to allow the length adjuster 18 to extend the trailer 12 in a manner to be described.

Referring to FIGS. 1, 3 and 5A through 5C, the trailer 12 also includes a plurality of wheels 20 extending down from the frame 15. Each wheel 20 is pivotally connected by an axle 21 to an offset leg 22 which extends down from the frame 15. The offset leg 22 is mounted to a suspension 24 in the form of a leaf spring which is mounted by supports 25 to the frame 15. The offset leg 22 and the wheel 20 are allowed to pivot through a pivoting mechanism 26. The pivoting mechanism 26 has a bolt 27 attached to the offset leg 22 and extends through a housing 28. A cross member 29 is attached to the housing 28 and suspension 24 and extends transversely across the frame 15 between a pair of wheels 20. The pivoting mechanism 26 also includes a housing 29 and a washer plate 31 and a castle nut 32 secured to the bolt 27. The trailer 12 also includes an adjustable friction pressure anti-pivot brake 30. The brake 30 may be of any type and is preferably a hydraulic brake cylinder receiving fluid pressure from a line 30a connected to a source (not shown). The brake 30 is to slow or stop pivoting of the wheel 20 when the wheel 20 is airborne such as when traveling at a fast speed on rough roads. The brake 30 may also be activated mechanically, electrically or pneumatically. It should be appreciated that the pivoting mechanism 26 allows the wheel 20 to be steerable as long as there is appreciable pressure between the road or ground surface and the tires of the wheels 20. It should also be appreciated that the pivoting mechanism 26 may be locked to prevent steering of the wheel 20. It should further be appreciated that the wheel 20 may be a single wheel or a dual wheel located inside or outside the frame 15.

Figure 7:
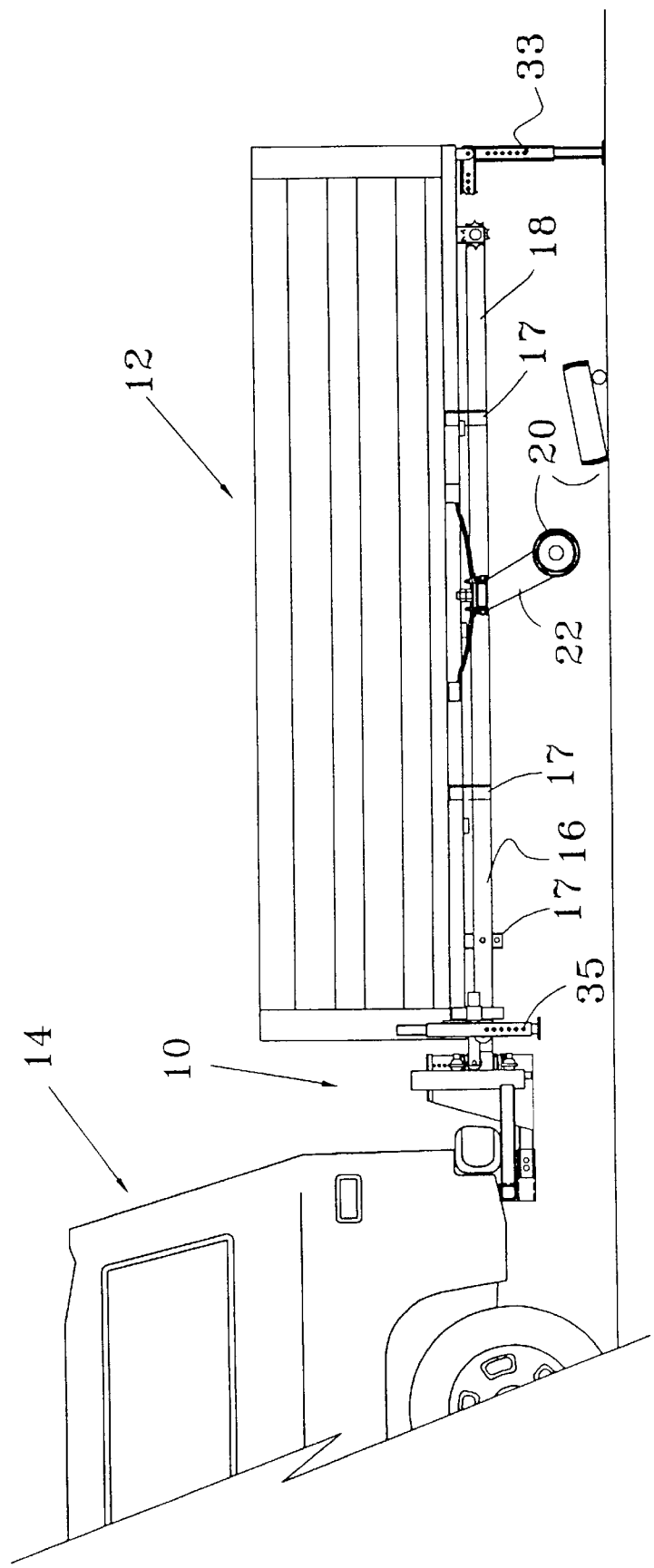
FIG. 7 is an elevational view of the hitch assembly and trailer of FIG. 1 illustrating the trailer with side racks and self-jacking leg for wheel repair.

The trailer 12 further includes a pair of rear 33 legs pivotally secured to an end support 34 of the frame 15. The legs 33 may be pivoted downwardly to engage the ground such that the wheels 20 may be removed for repair or replacement as illustrated in FIG. 7. The trailer 12 also includes a pair of front legs 35 (one shown). The front leg 35 and the rear legs 33 may be constructed such that the lengths thereof are adjustable. The front leg 35 includes a female tube 36 and a male tube 37 telescoping therethrough. A plurality of apertures or holes 38 extend through both the female tube 36 and the male tube 37 wherein a pin (not shown) may be inserted into one of the plurality of holes 38 to secure the male tube 37 with respect to the female tube 36 to establish a desired length of the front leg 35. It should be appreciated that the rear legs 33 may be adjusted in a similar manner.

Figure 4:
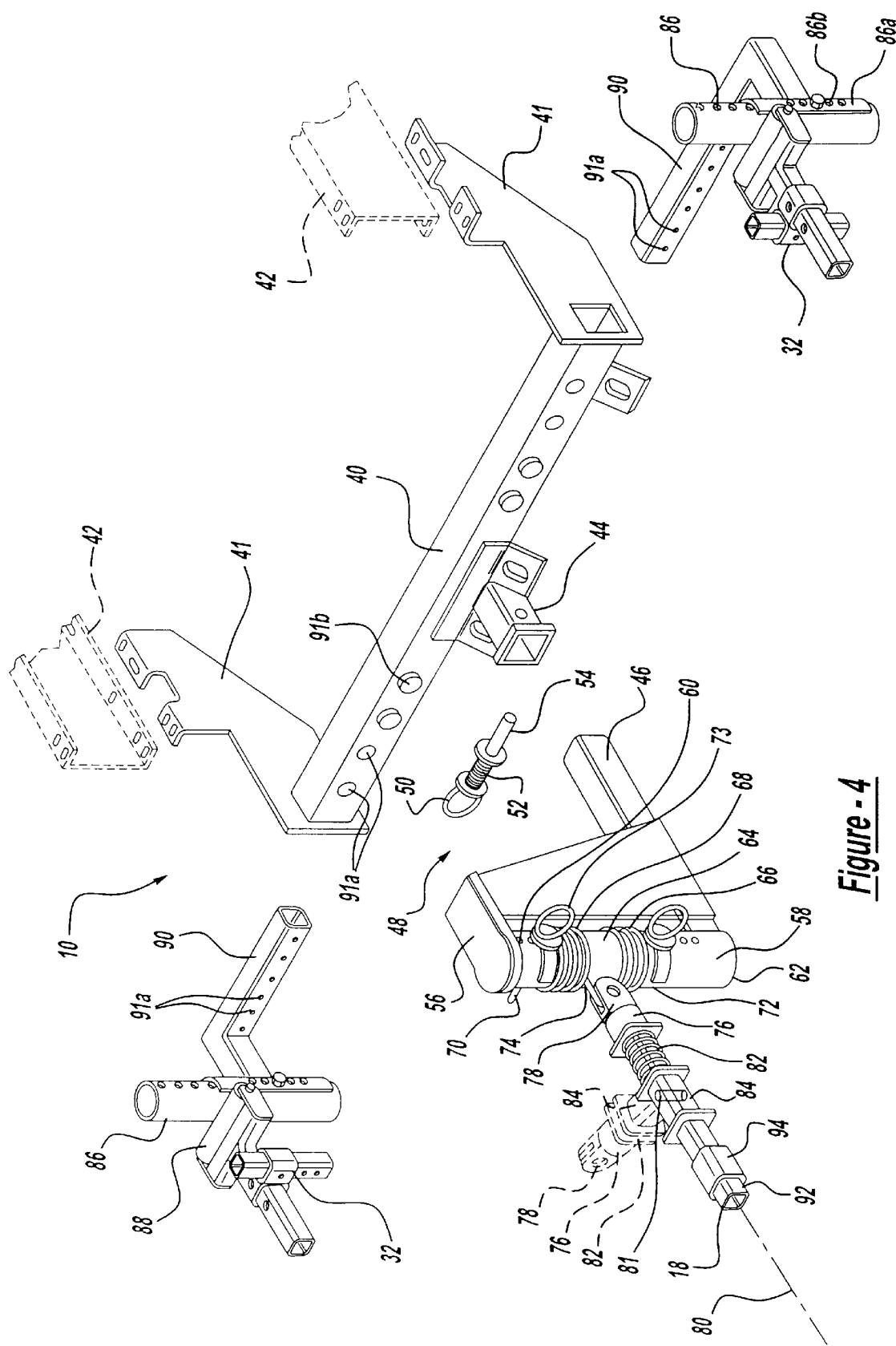
FIG. 4 is a pespective view of the hitch assembly of FIG. 1.
Figures 5A, 5B, 5C:
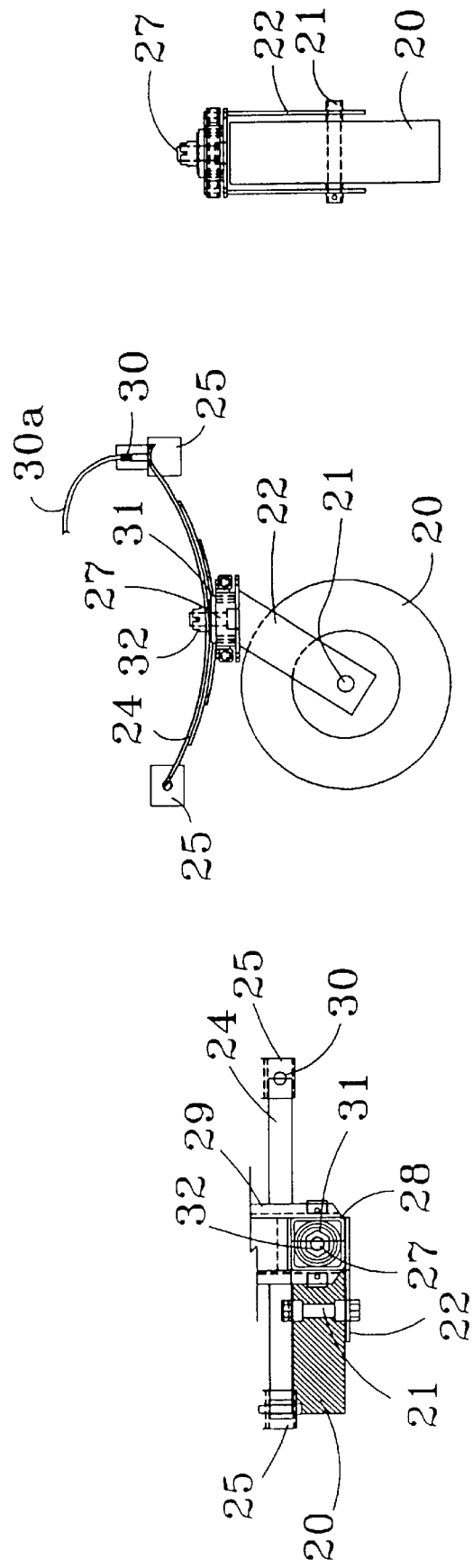
FIG. 5A is a plan view of a wheel for the trailer of FIG. 1.
FIG. 5B is an elevational view of the wheel for the trailer of FIG. 1.
FIG. 5C is a side view of the wheel for the trailer of FIG. 1.

Referring to FIG. 4, the hitch assembly 10 is used to connect the trailer 12 to the motor vehicle 14. The hitch assembly 10 includes a cross tube 40 secured by brackets or flanges 41 to a frame 42 of the motor vehicle 14. The flanges 41 are secured to the cross tube 40 by suitable means such as welding and to the frame 42 by suitable means such as fasteners (not shown). The cross tube 40 includes a trailer connector or hitch receiver 44.

The hitch assembly 10 includes a hitch tube 46 which is inserted into and received by the hitch receiver 44. The hitch tube 46 is securable to the hitch receiver 44. In one embodiment, the hitch tube 46 is secured to the hitch receiver 44 using a pin, generally shown at 48. The pin 48 includes a round handle 50 and a spring 52. Once the hitch tube 46 is in position relative to the hitch receiver 44, the pin 48 is slid through both the hitch receiver 44 and the hitch tube 46. The pin 48 is pushed all the way through such that the spring 52 is compressed against a side of the hitch receiver 44. The handle 50 is then rotated one hundred eighty degrees (180°) and gravity causes pivotal end 54 to extend perpendicularly to the rest of the pin 48. The spring 52 forces the pivotal end 54 against the side of the hitch receiver 44 effectively locking the hitch tube 46 to the hitch receiver 44.

The hitch assembly 10 also includes an adaptor structure 56 secured to the hitch tube 46. The adaptor structure 56 includes a receiving tube 58 attached to the hitch tube 46 by suitable means such as welding. In one embodiment, the receiving tube 58 extends perpendicularly to the hitch tube 46 and may point up or down according to need by vehicle height. The receiving tube 58 includes a first end 60 and a second end 62.

The adapter structure 56 also includes a sliding ring 64 encircling the receiving tube 58. The sliding ring 64 is movable along the receiving tube 58 between the first end 60 and the second end 62. The sliding ring 64 provides a first degree of motion for the length adjuster 18 and, more importantly, the trailer 12 when it is to be hitched by the hitch tube 46 to the hitch receiver 44. It should be appreciated that the sliding ring 64 can rotate approximately one hundred twenty degrees (120°) to the right or left which, in combination with the pin connection 74, 78 and the ability of the sliding ring 64 to travel vertically on the receiving tube 58 allows separate vertical movement of the motor vehicle 14 and trailer 12.

The adapter structure 56 includes at least one spring 66 extending about the receiving tube 58 adjacent the sliding ring 64. In one embodiment, a second spring 68 extends around the receiving tube 58 adjacent the other side of the sliding ring 64. Two pins 70 extend through the receiving tube 58 providing stops for the springs 66 such that the sliding ring 64 does not slide past a specific portion of the receiving tube 58. The portion of the receiving tube 58 in which the sliding ring 64 is to slide is determined by the height of the trailer 12 with respect to the height of the cross tube 40 and/or the hitch receiver 44. Each of the two pins 70 include a magnetic collar 72 which also acts as a spring seat near a handle 73 thereof In one embodiment, the pin 70 includes a pair of detents (not shown) which engage the edges of the receiving tube 58. The two springs 66, 68 force the edges of the receiving tube 58 into the detents locking the pin 70 in position. The sliding ring 64 includes a flange 74 which extends out from the sliding ring 64. The length adjuster 18 includes a swivel tongue 76 removably attachable by another pin 48 to the sliding ring 64 and, more specifically, the flange 74 of the sliding ring 64. The swivel tongue 76 includes a distal end 78 and is rotatable about a longitudinal axis 80 to provide a second degree of motion. Therefore, a swivel tongue 76 allows separate side to side tipping movement of the motor vehicle 14 and trailer 12 and allows the trailer 12 to be connected to the motor vehicle 14 when the ground is uneven. It should be appreciated that the combination of the sliding ring 64, with drilled flange 74 and distal end 78 with swivel tongue 76 allows the trailer 12 to be connected on uneven ground.

The swivel tongue 76 includes a pivot pin 81 extending therethrough perpendicular to the pivot pin 81 allowing the distal end 78 to pivot about the longitudinal axis 80 providing a third degree of freedom. As may be seen in FIG. 4, the distal end 78 of the swivel tongue 76 is pivotable about the pivot pin 81 allowing the trailer 12 to be connected to the motor vehicle 14 when the trailer 12 and the motor vehicle 14 are not perfectly aligned. The combination of the swivel tongue 76 and length adjuster 18 allows the connection even though the motor vehicle 14 and trailer 12 are at some distance apart laterally and horizontally. A spring 82 forces a stop collar 84 over the pivot pin 81 preventing the swivel tongue 76 from pivoting about the pivot pin 81 unless so desired by the operator of the motor vehicle 14. It should be appreciated that another pivot pin (not shown) may be located forward of the pivot pin 81 and horizontally oriented to allow more vertical movement of the distal end 78 if desired.

The hitch assembly 10 includes at least one bumper tube 86 extending out from the cross tube 40 on either side of the hitch receiver 44 such that they are disposed in space relation to the hitch tube 46. In one embodiment, there is at least one bumper tube 86 on either side of the hitch tube 46. The bumper tube 86 is adjustable vertically by a flange 86a having a plurality of apertures 86b and a fastener 86c extending through the apertures 86b in the flange 86a and bumper tube 86. The flange 86a is part of a horizontal adapter 90 to be described. Extending out from the trailer 12 on either side of the hitch tube 46 is a roller or glide 88 which abuts the bumper tube 86. The roller 88 rolls up and down the bumper tube 86 depending on the relative position of the trailer 12 with respect to the motor vehicle 14. The relative position varies due to the suspension 24 and suspension (not shown) of the motor vehicle 14 having different responses to uneven ground as they move thereacross. The relative position may also be attributable to the uneven ground itself. The roller 88 and bumper tube 86 interface is required on either side of the hitch tube 46 if the wheels 20 are to be steerable. The rollers 88 are connected to the frame 15 of the trailer 12 with the front legs 38. It should be appreciated that the point of contact between the bumper tube 86 and roller 88 must align both vertically and laterally with the pin point connecting the flange 74 and distal end 78 to allow the trailer 12 to flex independently of the motor vehicle 14. It should also be appreciated that the roller 88 may be attached to the motor vehicle 14 and the bumper tube 86 attached to the trailer 12.

The bumper tubes 86 are connected to the cross tube 40 with a horizontal adaptor 90. The horizontal adaptor 90 defines the spaced relation between the bumper tube 86 and the hitch tube 46. In one embodiment, the horizontal adaptor 90 is a tube insertable inside the cross tube 40. The horizontal adaptor 90 and cross tube 40 have a plurality of apertures 91a to allow lateral adjustment therebetween. It should be appreciated that fasteners 91b such as bolts pass through a corresponding pair of apertures 91a to secure the horizontal adapter 90 and cross tube 40 together.

Referring to FIGS. 2, 5, 6, 8 and 9, the length adjuster 18 includes a male tube 92 telescopingly disposed and slidably received within a female tube 94. The male tube 92 is attached to the swivel tongue 76 and the female tube 94 is attached by a pin 95 at one end to the guides 17 at the rear end of the frame 15. The length adjuster 18 includes at least one tongue 96 for adjusting the male tube 92 relative to the female tube 94. One tongue 96a goes through front tongue guides 17 just below the length adjuster 18 to prevent the bed of the trailer 12 from tilting. Another tongue 96b is a transversely extending member to engage holes or apertures 97 extending longitudinally along the male tube 92 and female tube 94. Tongue 96a includes a housing 98 secured to a front end of the frame 15. Tongue 96b includes a housing 98 secured to female tube 94. Each tongue includes a spring 99 disposed within the housing 98 and a first spring guide 100 secured to the housing 98 and a second spring guide 102 secured to the tongue 96' at each end of the spring 99. One end of the housing 100 and a portion of the tongue 96 may include cooperating lock-out slots 104 to allow the tongue 96 to be locked in place relative to the housing 100. It should be appreciated that when the tongue 96b is in the lock-out slot 104, the length adjuster 18 is free to move.

Figure 8:
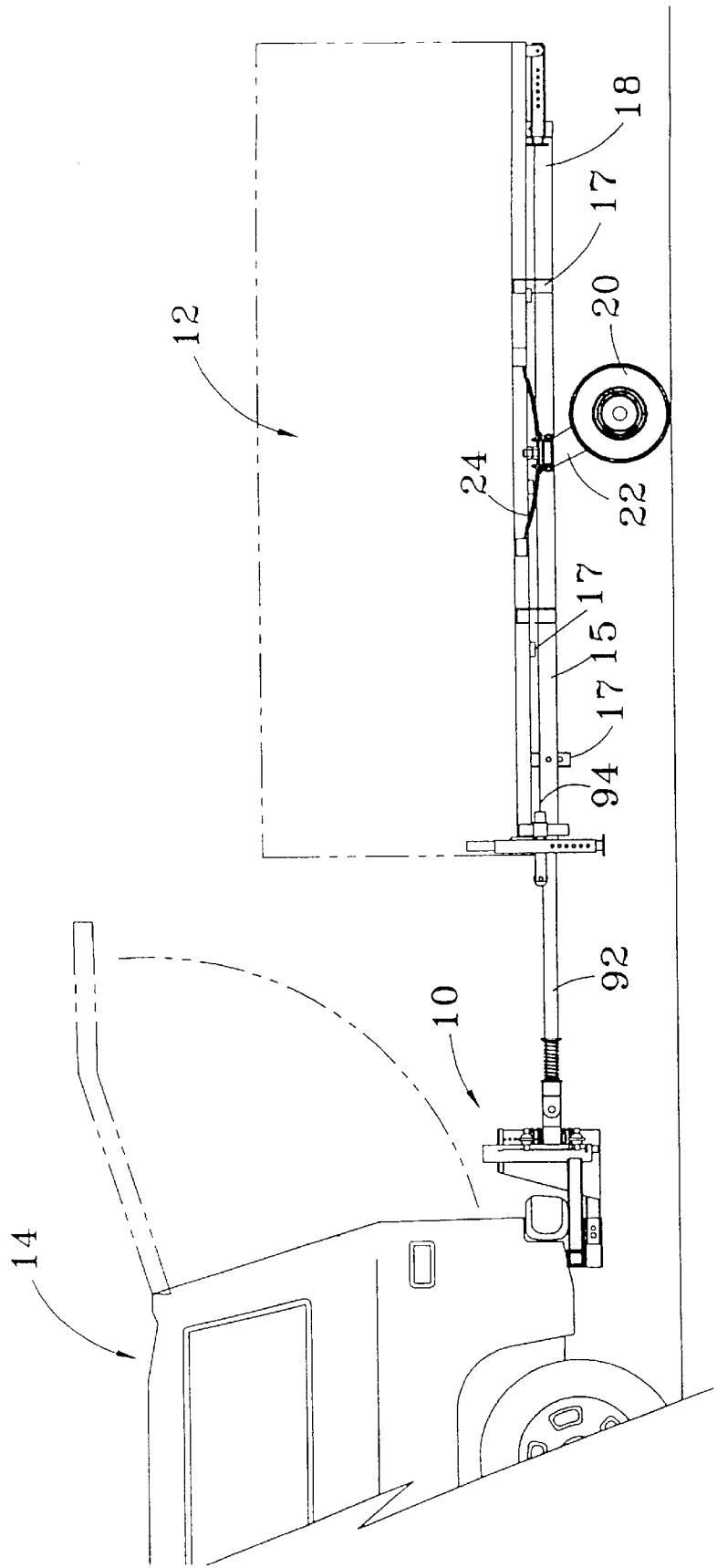
FIG. 8 is an elevational view of the hitch assembly and trailer of FIG. 1 illustrating the trailer with sideracks in phantom and extended for access to an interior rear end of the motor vehicle.
Figure 9:
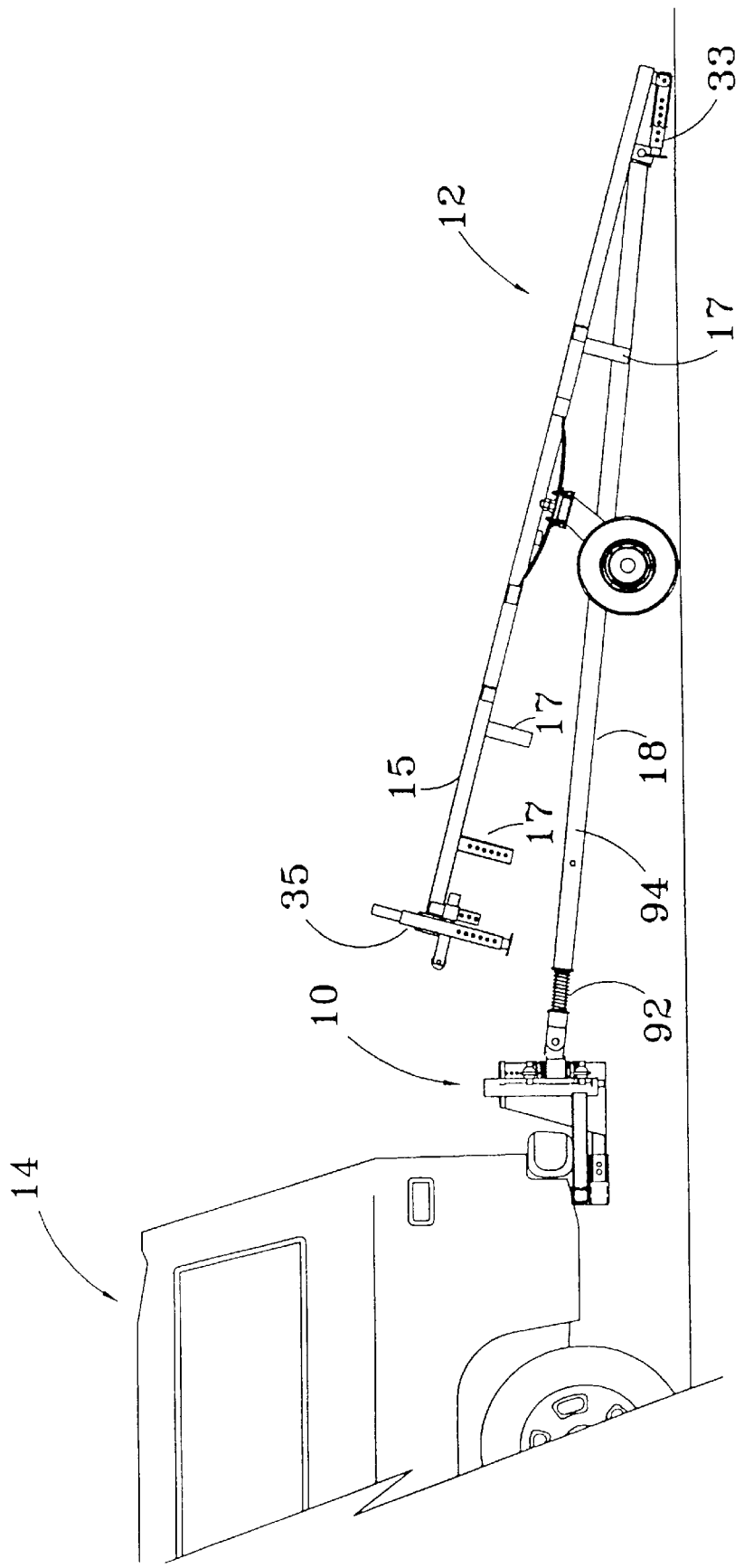
FIG. 9 is an elevational view of the hitch assembly and trailer of FIG. 1 illustrating the trailer with the wheels in reverse and tilted.

The tongue 96 also includes a handle 106 and warning flag 108 at one end to allow the tongue 96 to be moved transversely and to indicate that the tongue 96 has disengaged the male tube 92 and female tube 94. When this occurs, the male tube 92 may be adjusted longitudinally relative to the female tube 94 as illustrated in FIG. 8 to facilitate the hitching of the trailer 12 to the motor vehicle 14 or to allow access to an interior rear end of the motor vehicle 14 or to form a long-tongue trailer (not shown).

As stated above, tongue 96a goes through the front guides 17 just below the length extender 18. When tongue 96a and lock-out slot 104 are engaged, the bed of the trailer 12 is free to tilt. It should be appreciated that the wheels 20 may be reversed to the frame 15 to tilt the frame 15 relative to the length adjuster 18. It should also be appreciated that any type of hitch such as a rotating pin, ball-coupler, pintle, flexible tongue, cable tongue or fifth wheel is compatible with the trailer 12 if the above requirements are met.

In operation, once the motor vehicle 14 and trailer 12 are connected, all pins and tongues 84, 96a and 96b are in place, and the motor vehicle 14 is in motion, the swivel tongue 76 has rotational movement around longitudinal axis of length extender 18 after locked up by locking sleeve 84. The sliding ring 64 has movement allowed by the springs 66 and 68 vertically in combination with that allowed by the pin connecting distal end 78 and ring flange 74. Once close coupled, the rotational movement of the sliding ring 64 is restricted to a few degrees.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A hitch assembly and trailer comprising:

a trailer;

a hitch receiver mountable to a motor vehicle;

a mounting member removably secured to said hitch receiver;

an adaptor structure operatively connected to said mounting member and connected to said trailer, said adaptor structure including a receiving tube having a top end and a bottom end;

a roller and bumper tube secured to said trailer and securable to the motor vehicle, said roller to abut said bumper tube; and a sliding ring encircling said receiving tube movable along said receiving tube between said top end and said bottom end to provide a first degree of motion to said trailer when secured by said mounting member to said hitch receiver and rotatable about an axis of said receiving tube to provide a second degree of motion to said trailer when secured by said mounting member to said hitch receiver.

2. A hitch assembly and trailer as set forth in claim 1 including an extendable tongue attached to said sliding ring.

3. A hitch assembly and trailer as set forth in claim 2 wherein said extendable tongue includes a pivot pin extending therethrough perpendicular to a longitudinal axis of said extendable tongue allowing a distal end of said extendable tongue to pivot about said pivot pin.

4. A hitch assembly and trailer as set forth in claim 1 including a spring extending about said receiving tube adjacent said sliding ring.

5. A hitch assembly and trailer as set forth in claim 1 including a horizontal adaptor secured to said at least one bumper tube, said horizontal adaptor defining the spaced relation between said bumper tube and said mounting member.

6. A hitch assembly and trailer as set forth in claim 3 including a stop collar disposed about said extendable tongue and a spring to urge said stop collar over said pivot pin to resist the distal end of said extendable tongue from pivoting about said pivot pin.

7. A hitch assembly and trailer comprising:

a trailer;

a hitch receiver mountable to a motor vehicle;

a mounting member removably secured to said hitch receiver;

an adaptor structure operatively connected to said mounting member and connected to said trailer, said adaptor structure including a receiving tube having a top end and a bottom end;

a sliding ring encircling said receiving tube movable along said receiving tube between said top end and said bottom end to provide a first degree of motion to said trailer; and a roller and bumper tube secured to said trailer and securable to the motor vehicle, said roller to abut said bumper tube.

8. A hitch assembly and trailer comprising:

a trailer;

a hitch receiver mountable to a motor vehicle;

a mounting member removably secured to said hitch receiver;

an adaptor structure operatively connected to said mounting member and connected to said trailer, said adaptor structure including a receiving tube having a top end and a bottom end;

a sliding ring encircling said receiving tube movable along said receiving tube between said top end and said bottom end to provide a first degree of motion to said trailer;

a roller and bumper tube secured to said trailer and securable to the motor vehicle, said roller to abut said bumper tube; and wherein said bumper tube and said roller contact point is aligned both vertically and laterally with a pin point connecting said adapter structure to said trailer.

9. A hitch assembly and trailer comprising:

a trailer;

a hitch receiver mountable to a motor vehicle;

a roller and bumper tube secured to said trailer and securable to the motor vehicle, said roller to abut said bumper tube;

a mounting member removably secured to said hitch receiver;

an adaptor structure operatively connected to said mounting member and connected to said trailer, said adaptor structure including a receiving tube having a top end and a bottom end;

a sliding ring encircling said receiving tube movable along said receiving tube between said top end and said bottom end to provide a first degree of motion to said trailer when secured by said mounting member to said hitch receiver and rotatable about an axis of said receiving tube to provide a second degree of motion to said trailer when secured by said mounting member to said hitch receiver;

an extendable tongue attached to said sliding ring; and a spring extending about said receiving tube adjacent said sliding ring.

10. A hitch assembly and trailer comprising:

a trailer;

a hitch receiver mountable to a motor vehicle;

a mounting member removably secured to said hitch receiver;

an adaptor structure operatively connected to said mounting member and connected to said trailer, said adaptor structure including a receiving tube having a top end and a bottom end;

a sliding ring encircling said receiving tube movable along said receiving tube between said top end and said bottom end to provide a first degree of motion to said trailer when secured by said mounting member to said hitch receiver and rotatable about an axis or said receiving tube to provide a second degree of motion to said trailer when secured by said mounting member to said hitch receiver;

an extendable tongue attachable to said sliding ring;

a spring extending about said receiving tube adjacent said sliding ring; and at least one bumper tube disposed in spaced relation to said mounting member and secured to either one of said trailer and the motor vehicle and at least one roller secured to the other one of said trailer and the motor vehicle, said at least one roller to abut said at least one bumper tube.

11. A hitch assembly and trailer as set forth in claim 10 wherein said adaptor structure extends substantially perpendicularly to said mounting member.

* * * * *